E. W. WAITE.
Joint for Carriage-Top Prop.
No. 82,456.
Patented Sept. 22, 1868.
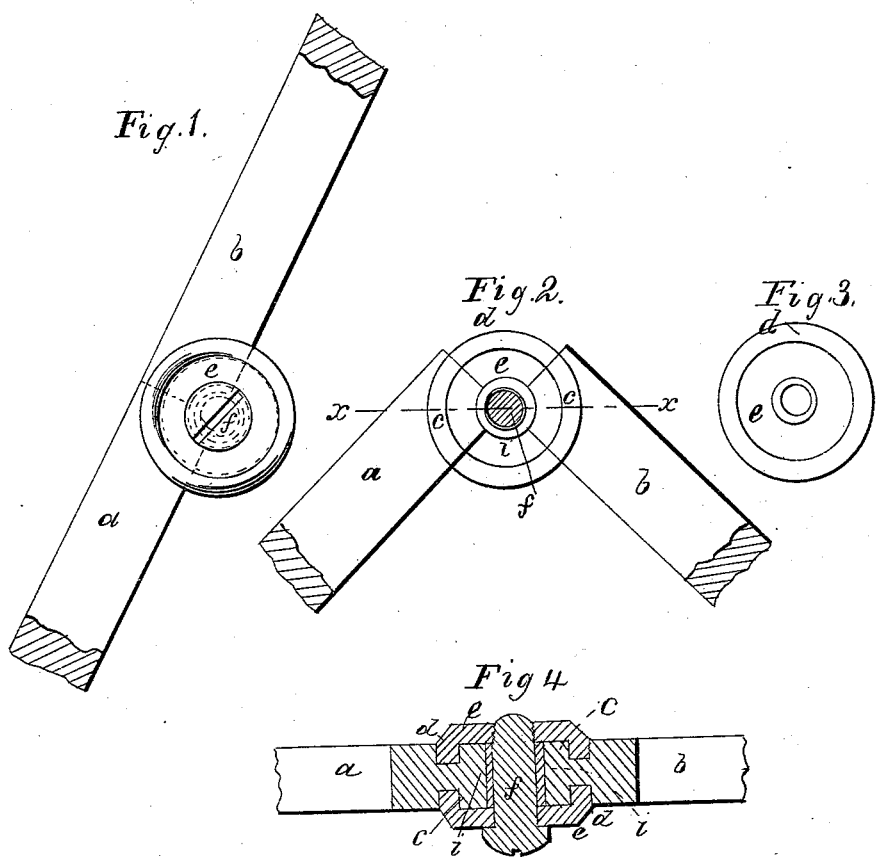

United States Patent Office.

ELBERTSON W. WAITE, OF NEW HAVEN, CONNECTICUT.

Letters Patent No. 82,456, dated September 22, 1868.

---

IMPROVED JOINT FOR CARRIAGE-TOP PROPS.

---

The Schedule referred to in these Letters Patent and making part of the same.

---

TO ALL WHOM IT MAY CONCERN:

Be it known that I, ELBERTSON W. WAITE, of New Haven, in the State of Connecticut, have invented, made, and applied to use, a certain new and useful Improvement in Joints for Carriage-Props and other articles; and I do hereby declare the following to be a full, clear, and exact description of the said invention, reference being had to the annexed drawing, making part of this specification, wherein—

Figure 1 is an elevation of said joint,

Figure 2 is a view, with one of the joint-pieces removed,

Figure 3 is an elevation of the inner face of one of the joint-plates, and

Figure 4 is a section at the line $x$ $x$, fig. 2.

Similar marks of reference denote the same parts.

A reliable cheap joint for the bars of a carriage-prop or similar article, has long been sought, in consequence of the costliness and difficulty of making rule-joints upon the ends of bars that are rolled or otherwise shaped.

My invention is designed to form a very strong, cheap, and reliable joint at the ends of two bars that are to be united, and consists in segmental grooves near the ends of the parts to be united, combined with a circular rib or ribs upon a joint-piece or pieces held in position against said bars, so that the grooves and ribs become the surfaces that hold the bars together, and on which they move in swinging.

In the drawing, $a$ and $b$ are the end portions of the bars that are to be united by my joint. In the sides of these, near the ends, segmental grooves are formed, as at $c$ $c$, into which the rib $d$ of the joint-piece $e$ enters.

I have shown joint-pieces $e$, ribs $d$, and grooves $c$, on both sides of the bars $a$ and $b$, held together by the bolt $f$, and a cylinder, $i$, employed to keep the joint-pieces $e$ a uniform distance apart, and prevent the bolt $f$ working loose. It will, however, be evident that one of the joint-pieces might be plain, but I prefer the construction shown.

The joint-pieces $e$ might be riveted or otherwise held together, and be more or less ornamental in their exterior surface.

In making stop or rule-joints of the character shown, four bars, laid together, may have the quarter-circle segmental grooves formed at one operation, thus greatly facilitating the manufacture, and a hole bored at the point of intersection, gives the necessary recess for the bolt $f$ or cylinder $i$.

What I claim, and desire to secure by Letters Patent, is—

1. A joint, formed by combining segmental grooves, near the ends of the parts to be united, with a circular rib upon the joint-piece, substantially as specified.

2. The joint-pieces $e$, with circular ribs $d$, entering segmental grooves $c$ in the bars $a$ $b$, in combination with the cylinder $i$ and bolt or rivet $f$, substantially as specified In witness whereof, I have hereunto set my signature, this 29th day of August, A. D. 1868.

E. W. WAITE.

Witnesses:
   GEO. T. PINCKNEY,
   CHAS. H. SMITH.